United States Patent
Wedmore

(10) Patent No.: US 11,689,962 B2
(45) Date of Patent: Jun. 27, 2023

(54) REDUCING NETWORK RESOURCE CONGESTION FROM DISTRIBUTED SOURCED ITEMS

(71) Applicant: Capital One Services, LLC, McLean, VA (US)

(72) Inventor: Amy Wedmore, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 17/199,351

(22) Filed: Mar. 11, 2021

(65) Prior Publication Data

US 2022/0295342 A1    Sep. 15, 2022

(51) Int. Cl.
*H04W 28/02*    (2009.01)

(52) U.S. Cl.
CPC .............................. *H04W 28/0289* (2013.01)

(58) Field of Classification Search
CPC .......... H04W 28/0289; G06Q 10/0833; G06Q 40/02; G06Q 10/0631; G06N 20/00; G06F 16/29; G06K 9/6215
See application file for complete search history.

(56) References Cited

U.S. PATENT DOCUMENTS

| | | | |
|---|---|---|---|
| 6,378,770 B1 * | 4/2002 | Clark | G07D 11/25 |
| | | | 235/379 |
| 9,412,100 B1 * | 8/2016 | Shearer | G06Q 20/204 |
| 2018/0251301 A1 * | 9/2018 | Wolf | H04W 12/69 |
| 2020/0356961 A1 * | 11/2020 | Dryer | G06Q 10/20 |

* cited by examiner

*Primary Examiner* — Khaled M Kassim
*Assistant Examiner* — Najeeb Ansari
(74) *Attorney, Agent, or Firm* — Perkins Coie LLP

(57) ABSTRACT

In certain embodiments, a current amount of an item available from a network resource may be monitored. Based on the monitoring indicating that the current amount fails to satisfy a first threshold, one or more sources may be identified. The one or more sources may be within a threshold proximity of the network resource, and distances between the one or more sources and the network resource may be determined. One or more requests for the amounts of the item to be transferred from the one or more sources to the network resource within time frames may be generated. For example, the time frames may be based on the distances. The one or more requests may be transmitted to the one or more sources.

20 Claims, 5 Drawing Sheets

REDUCING NETWORK RESOURCE CONGESTION FROM DISTRIBUTED SOURCED ITEMS

FIELD OF THE INVENTION

The invention relates to facilitating reduction of network resource congestion, for example, by sourcing distributed items in such a way that avoids congestion at a network resource.

BACKGROUND OF THE INVENTION

Advances in computing and software technologies have made it possible to source distributed items for a network resource. For example, a network resource may require certain items to perform operations and may obtain those items from a large collection of distributed sources. However, current sourcing technologies often overload network resources with requests, which in turn causes congestion at the network resources. Network resource congestion can lead to delays or failures related to waiting or repeated availability inquiries. These and other drawbacks exist.

SUMMARY OF THE INVENTION

Aspects of the invention relate to methods, apparatuses, or systems for facilitating reduction of network resource congestion from distributed sourced items.

In some embodiments, a network resource on a network may be monitored to assess a current or future predicted amount of an item available from the network resource, and one or more time frames may be determined for transferring amounts of the item to or from the network resource such that none of the time frames overlaps with one another, the time frames do not overlap by more than a threshold amount, etc. (e.g., to reduce congestion at the network resource). In some embodiments, based on the monitoring indicating that the current or future predicted amount fails to satisfy a first threshold, a plurality of sources within a threshold proximity of the network resource may be identified. Distances between the network resource and the plurality of sources, respectively, may be determined, and the time frames for transferring amounts may be established based on the distances. As an example, a plurality of requests may be generated based on the time frames, where the requests include (i) a first request for a first source to transfer a first amount of the item to the network resource during a first time frame of the time frames, (ii) a second request for a second source to transfer a second amount of the item to the network resource during a second time frame of the time frames, or other requests.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
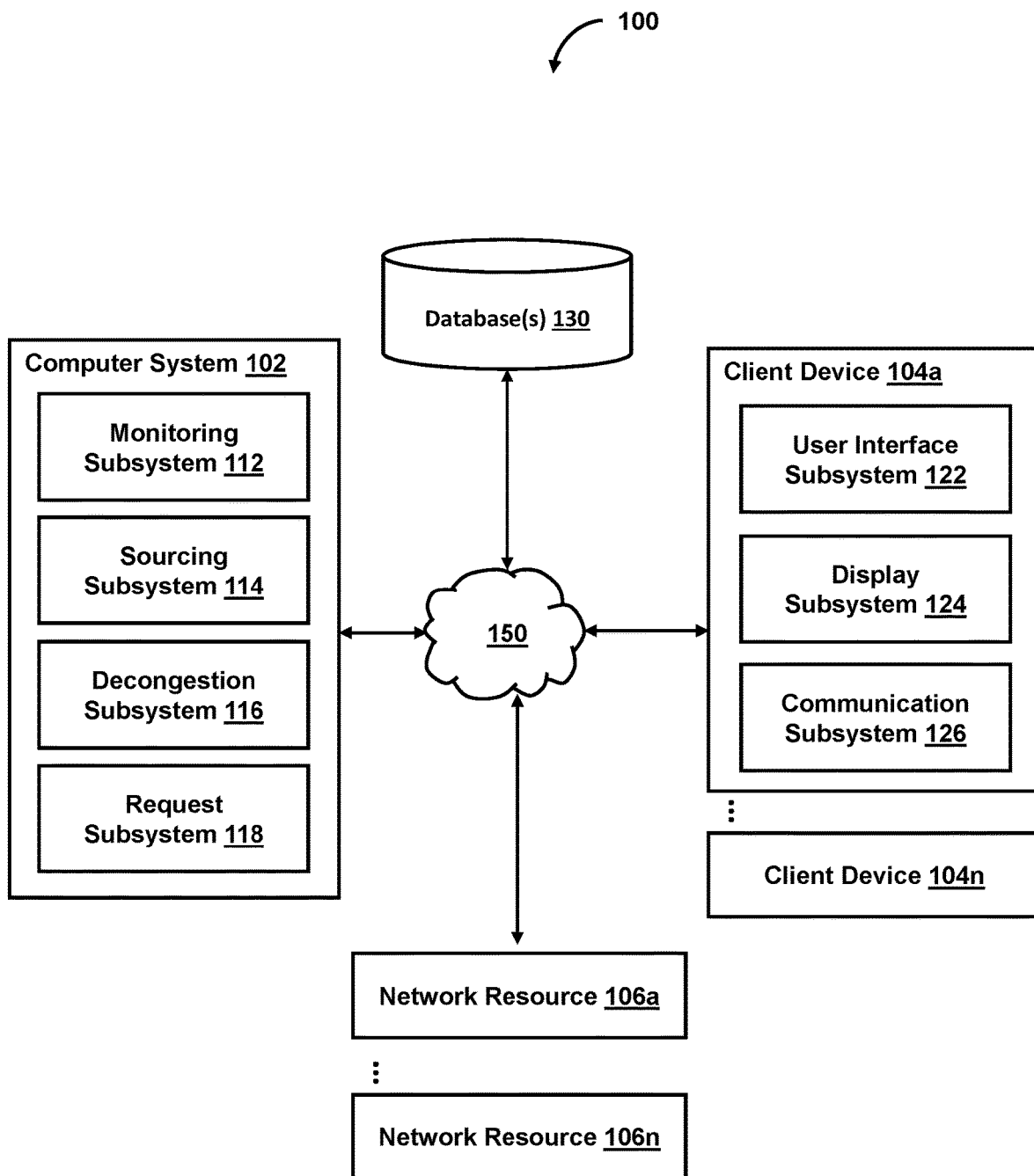
FIG. 1 shows a system for facilitating reduction of network resource congestion, in accordance with one or more embodiments.

FIG. 1 shows a system 100 for facilitating reduction of network resource congestion, in accordance with one or more embodiments. As shown in FIG. 1, system 100 may include computer system 102, client device(s) 104 (or client devices 104a-104n), network resource(s) 106 (or network resources 106a-106n), or other components. Computer system 102 may include monitoring subsystem 112, sourcing subsystem 114, decongestion subsystem 116, request subsystem 118, or other components. Each client device 104 may include user interface subsystem 122, display subsystem 124, communication subsystem 126, or other components. Each client device 104 may include any type of mobile terminal, fixed terminal, or other device. By way of example, client device(s) 104 may include a desktop computer, a notebook computer, a tablet computer, a smartphone, a wearable device (e.g., augmented reality glasses or goggles), or another client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device(s) 104.

In some embodiments, system 100 may facilitate reduction of network resource congestion. In some embodiments, system 100 may monitor a network resource on a network to assess a current or future predicted amount of an item available from the network resource and establish one or more time frames for transferring amounts of the item to or from the network resource such that none of the time frames overlaps with one another, the time frames do not overlap by more than a threshold amount, etc. (e.g., to reduce congestion at the network resource). As an example, system 100 may generate and transmit one or more requests to a set of sources that enable and limit particular amounts of the item that are transferrable to or from the network resource (or which sources are to interact with the network resource) within respective ones of the established time frames.

In some embodiments, computer system 102 (e.g., monitoring subsystem 112) may monitor a network resource 106 or multiple network resources 106a-106n on a network (e.g., network 150). Each network resource may be associated with an item that the network resource required to perform one or more functions of the network resource. In some embodiments, monitoring subsystem 112 may monitor the amount of the item of each network resource over time. In some embodiments, each network resource may be associated with various thresholds. The thresholds may represent amounts of the item associated with the network resource. In some embodiments, monitoring subsystem 112 may identify, based on the monitoring, a network resource for which a current amount of the item fails to satisfy a first threshold. Based on the current amount of the item failing to satisfy the first threshold, computer system 102 (e.g., sourcing subsystem 114) may identify sources within a threshold proximity of the network resource. Sourcing subsystem 114 may determine distances between the sources and the network resource. Computer system 102 (e.g., decongestion subsystem 116) may establish time frames during which amounts of the item are to be transferred from the sources to the network resource. For example, in some embodiments, decongestion subsystem 116 may establish time frames that do not overlap with one another in order to minimize congestion at the network resource. In some embodiments, the time frames may be based on the distances between the sources and the network resource. Computer system 102 (e.g., request subsystem 118) may generate requests for amounts of the items to be transferred from the sources to the network resource. For example, the requests may include the time frames established by decongestion subsystem 116. In some embodiments, each request may include a requested amount of the item for each source. Request subsystem 118 may transmit the requests to the sources, and the network resource may receive amounts of the item during the established time frames. In some embodiments, request subsystem 118 may cease requesting the amounts of the item from the sources once the network resource has received sufficient amounts of the item (e.g., once the current amount of the item satisfies a second threshold).

In some embodiments, monitoring subsystem 112 may monitor the amount of the item of each network resource over time. For example, monitoring subsystem 112 may periodically ping each network resource for an amount of the item currently held by the network resource. In some embodiments, monitoring subsystem 112 may request an amount of the item associated with a network resource each time the network resource performs an operation (e.g., each time the network resource accesses a program, executes a smart contract, dispenses tokens or currency, etc.). In some embodiments, monitoring subsystem 112 may monitor the amount of the item associated with each network resource constantly or at another time interval. In some embodiments, based on the monitoring, monitoring subsystem 112 may identify a network resource having a current amount of the item that fails to satisfy a first threshold (e.g., due to the current amount falling below the first threshold or due to the current amount exceeding the first threshold). In some embodiments, monitoring subsystem 112 may identify a network resource for which an amount of the item is predicted to fail to satisfy the first threshold in the future. For example, monitoring subsystem 112 may identify a trend in the current amount of the item (e.g., a downward trend, an upward trend, etc.) and, based on the identified trend, may predict that the amount of the item of the network resource will fail to satisfy the first threshold in the future. Computer subsystem (e.g., sourcing subsystem 114) may then identify sources within a threshold proximity of the network resource and may request amounts of the item to be transferred between the sources and the network resource. The network resource may receive the amounts of the item from the sources (e.g., if the current amount of the item falls or is predicted to fall below the first threshold) or may transfer amounts of the item to the sources (e.g., if the current amount of the item exceeds or is predicted to exceed the first threshold) until the current amount of the item of the network resource satisfies a second threshold.

In some embodiments, each network resource may be in a first state or a second state at any particular time. For example, the first state may be a state in which the network resource performs operations without the item being replenished. When the network resource is in the first state, the amount of the item may decrease over time, such as each time the network resource performs an operation. In some embodiments, the network resource may only support operations that expend amounts of the item while the network resource is in the first state. In some embodiments, while the network resource is in the second state, the network resource may support both expending and replenishing of the item. In some embodiments, while the network resource is in the second state, the network resource may support only replenishing of the item. In some embodiments, the network resource may be associated with additional states in which the network resource is configured to support certain operations. In some embodiments, the network resource may initially be in the first state. Once monitoring subsystem 112 identifies that the current amount of the item has dropped below a certain point, the network resource may switch to the second state. The network resource may remain in the second state while the sourcing subsystem 114 requests and receives amounts of the item from various sources. The network resource may switch back to the first state once the amount of the item associated with the network resource reaches a certain point (e.g., once the item is sufficiently replenished such that a current amount of the item satisfies a second threshold).

In some embodiments, each network resource may be associated with various thresholds. For example, each network resource may have a first threshold, a second threshold, or other threshold amounts. For example, the first and second thresholds may represent amounts of the item associated with the network resource. In some embodiments, the thresholds may be percentages of a total capacity for the item, a predetermined amount of the item, or another threshold. In some embodiments, the first threshold may indicate a point at which the network resource is not associated with enough of the item to continue operating beyond a certain time period. In other words, the first threshold may indicate a point at which the network resource requires replenishment of the item. In some embodiments, the first threshold may indicate a point at which the network resource is associated with too much of the item to continue operating beyond a certain time period. In other words, the first threshold may indicate a point at which the network resource requires removal of an amount of the item. In some embodiments, the first threshold may indicate another status of the network resource. In some embodiments, monitoring subsystem 112 may identify once an amount of the item associated with a network resource fails to satisfy the first threshold. Based on the amount of the item failing to satisfy the first threshold, sourcing subsystem 114 may request that amounts of the item be transferred to or from various sources until the amount of the item associated with the network resource satisfies the second threshold. In some embodiments, the second threshold may indicate a point at which the network resource has an appropriate amount of the item to continue operating for an extended period of time. In other words, the second threshold may indicate a point at which the network resource no longer needs replenishment or removal of the item. In some embodiments, the second threshold may indicate another status of the network resource.

In some embodiments, the first and second thresholds may be specific to each network resource. For example, monitoring subsystem 112 may obtain utilization information related to the item and each network resource. The utilization information may indicate how frequently the network resource is utilized (e.g., by performing operations that expend the item), at what times and on what days the network resource is utilized most frequently, or other utilization information. Monitoring subsystem 112 may set the first threshold based on the utilization information. For network resources with higher utilization, the first threshold may be higher (e.g., a higher percentage or a larger amount), while for network resources with lower utilization, the first threshold may be lower (e.g., a lower percentage or a smaller amount). Based on the first threshold that is specific to each network resource, monitoring subsystem 112 may identify when the amount of the item fails to satisfy the first threshold and may cause the sourcing subsystem 114 to request amounts of the item to be transferred between sources and the network resource.

In some embodiments, monitoring subsystem 112 may obtain capacity information related to the item and each network resource. For example, the capacity information may indicate a maximum amount of the item that can be associated with the network resource. In other words, the capacity information may indicate an amount of item associated with the network resource when the network resource is one hundred percent full. Monitoring subsystem 112 may set the second threshold based on the capacity information. For network resources with higher capacities, the second threshold may be higher (e.g., a larger amount) or the same (e.g., the same percentage), while for network resources with lower utilization, the first threshold may be lower (e.g., a smaller amount) or the same (e.g., the same percentage). In some embodiments, monitoring subsystem 112 may set the second threshold based on a combination of the capacity information and the utilization information. Based on the second threshold that is specific to each network resource, monitoring subsystem 112 may identify when the amount of the item of the network resource satisfies the second threshold after receiving amounts of the item from one or more sources. Sourcing subsystem 114 may cease requesting amounts of the item once the second threshold is satisfied.

Figure 2A:
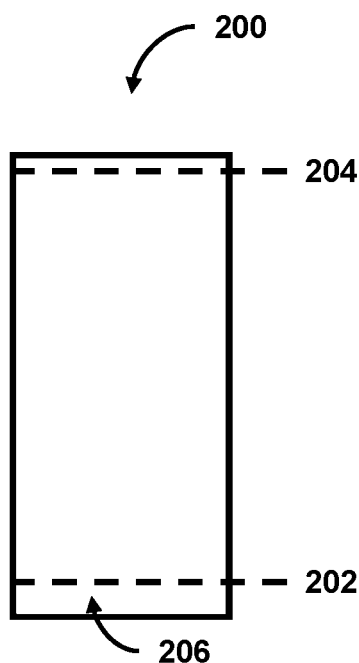
FIGS. 2A-2D show current amounts of the item and thresholds of the network resources, in accordance with one or more embodiments.

FIGS. 2A-2D show current amounts 206, 208, and 210 of the item and thresholds 202 and 204 associated with a first network resource 200 and current amount 256 and thresholds 252 and 254 associated with a second network resource 250, in accordance with one or more embodiments. For example, FIG. 2A represents a network resource 200 with an amount 206 of the item. Network resource 200 may be associated with a first threshold 202 and a second threshold 204. As shown in FIG. 2A, the amount 206 of the item satisfies the first threshold 202 but does not satisfy the second threshold 204. Based on the amount 206 of the item associated with the network resource 200, monitoring subsystem 112 may determine that the network resource should be left in its current state. For example, if network resource 200 as shown in FIG. 2A is currently in the first state (e.g., as described above), monitoring subsystem 112 may determine that network resource 200 will remain in the first state until a certain event occurs (e.g., as described below). In some embodiments, if network resource 200 as shown in FIG. 2A is currently in the second state (e.g., as described above), monitoring subsystem 112 may determine that network resource 200 will remain in the second state until a certain event occurs (e.g., as described below).

Figure 2B:
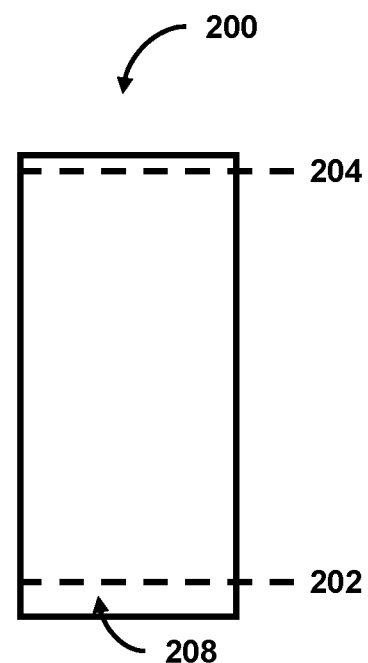
Figure 2C:
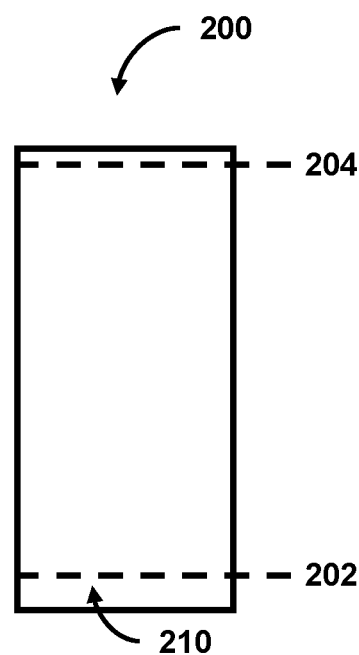
Figure 2D:
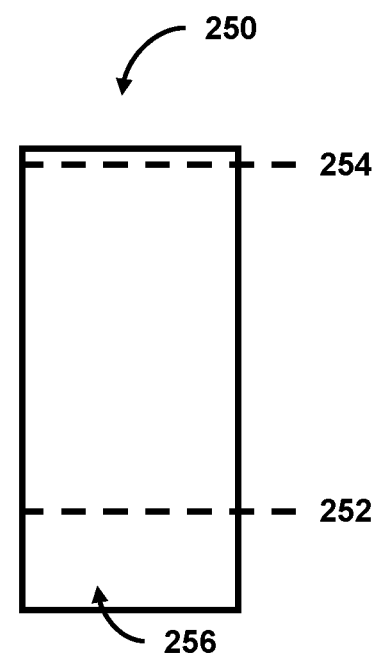

FIG. 2D represents a network resource 250 with an amount 256 of the item. Network resource 250 may be a different network resource than network resource 200. In some embodiments, network resource 250 may represent network resource 200 during a different scenario (e.g., during a busier time of day, during a busier day of the week, or during a busier time of year). As shown in FIG. 2D, network resource 250 may be associated with a first threshold 252 and a second threshold 254. As described above, the first threshold may be set based on utilization of the network resource and the second threshold may be set based on capacity of the network resource or a combination of capacity and utilization of the network resource. Network resource 250 may have the same capacity as network resource 200. Hence, the second threshold 254 of network resource 250 may be the same as the second threshold 204 of the network resource 200. In some embodiments, network resource 250 may have a higher utilization rate than network resource 200. Because of the higher utilization rate of network resource 250, the first threshold 252 associated with network resource 250 may be higher than the first threshold 202 associated with network resource 200. In some embodiments, first and second thresholds associated with network resources may be set according to other or additional criteria.

In some embodiments, monitoring subsystem 112 may identify, based on the monitoring, a network resource for which a current amount of the item fails to satisfy the first threshold. For example, FIG. 2B represents network resource 200 with an amount 208 of the item. In some embodiments, FIG. 2B may represent network resource 200 at some time later than FIG. 2A. As shown in FIG. 2B, the amount 208 of the item does not satisfy the first threshold 202. In some embodiments, a failure to satisfy the first threshold 202 may be an event that monitoring subsystem 112 identifies. For example, once the amount of the item associated with the network resource fails to satisfy the first threshold, computer system 102 (e.g., sourcing subsystem 114) may identify sources from which amounts of the item may be transferred to the network resource. In some embodiments, the sources may include at a first source and a second source. In some embodiments, monitoring subsystem 112 may simultaneously cause the network resource 200 to switch states. For example, the network resource 200 may be in the first state and, in response to the amount 208 failing to satisfy the first threshold 202, the network resource 200 may switch to the second state. In other words, once the amount 208 of the item fails to satisfy the first threshold 202, the network resource 200 may begin to accept interactions (e.g., with users or sources) that replenish the item. Network resource 200 may request and receive amounts of the item from the sources until the second threshold 204 is reached (e.g., as discussed below).

Figure 3:
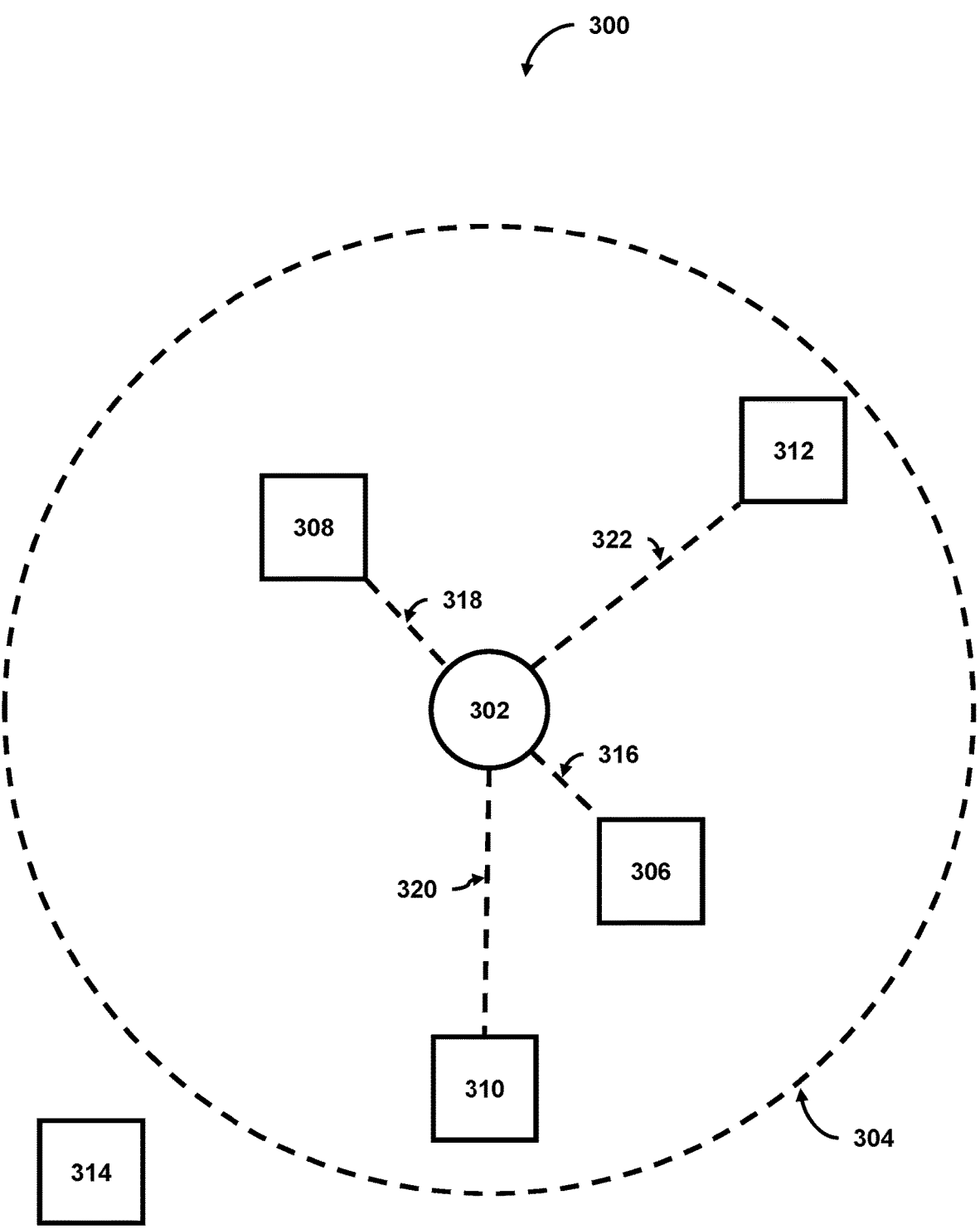
FIG. 3 shows a network resource and a plurality of sources in an area, in accordance with one or more embodiments.

In some embodiments, based on monitoring subsystem 112 identifying that the amount of the item fails to satisfy the first threshold (e.g., as shown in FIG. 2B), sourcing subsystem 114 may identify sources within a threshold proximity of the network resource. For example, FIG. 3 shows a network resource 302 and a plurality of sources in an area 300, in accordance with one or more embodiments. In some embodiments, network resource 302 may correspond to network resource 106 and sources 306-314 may be associated with client devices 104a-104n, as shown in FIG. 1. In some embodiments, certain sources (e.g., source 306, source 308, source 310, and source 312) may be within a threshold proximity 304 of network resource 302, while other sources (e.g., source 314) may be outside the threshold proximity 304 of network resource 302. In some embodiments, of the sources within the threshold proximity 304 of network resource 302, sourcing subsystem 114 may determine distances between the network resource and each source. The distances may be physical or network distances or they may represent latency or bandwidth. For example, sourcing subsystem 114 may determine distance 316 between network resource 302 and source 306, distance 318 between network resource 302 and source 308, distance 320 between network resource 302 and source 310, and distance 322 between network resource 302 and source 312. Based on the distances between the network resource and the sources, sourcing subsystem 114 may request amounts of the item to be transferred to the network resource from sources within a threshold distance from the network resource. The network resource may then receive the requested amounts of the item from those sources.

In some embodiments, based on monitoring subsystem 112 identifying that the amount of the item fails to satisfy the first threshold, sourcing subsystem 114 may identify sources within a threshold distance along a route from the network resource. In some embodiments, sourcing subsystem 114 may determine a route between each source and the network resource. For example, each source may need to travel along a route that differs from the direct distance to the network resource. For example, a source may be connected to a network resource via cables or connections which do not follow a straight line. Sourcing subsystem 114 may therefore determine a length of the route between each source and the network resource. In some embodiments, the threshold distance may be based on a route instead of a straight-line distance between a source and the network resource. For example, if the total distance along a route (e.g., that a source must travel in order to transfer an amount of the item to a network resource) exceeds a threshold, sourcing subsystem 114 may exclude that source from the identified sources. Based on the routes between the network resource and the sources, sourcing subsystem 114 may request amounts of the item to be transferred to the network resource from sources within a threshold distance (i.e., along the routes) from the network resource. The network resource may then receive the requested amounts of the item from those sources.

In another example, a source may be separate from the network resource geographically and may therefore need to navigate around obstacles to arrive at the network resource. For example, each network resource may be a physical resource (e.g., an automated teller machine (ATM) or another physical network resource). For ATMs, the items may be currencies (e.g., tokens or bills) or other items, and the ATM may require a certain amount of currency in the machine in order to dispense money to users. Sourcing subsystem 114 may determine a length of the route between each source and the network resource. In some embodiments, the threshold distance may be based on a route instead of a straight-line distance between a source and the network resource. For example, if the total distance along a route (e.g., that a source must travel in order to transfer an amount of the item to a network resource) exceeds a threshold, sourcing subsystem 114 may exclude that source from the identified sources. Based on the routes between the network resource and the sources, sourcing subsystem 114 may request amounts of the item to be transferred to the network resource from sources within a threshold distance (i.e., along the routes) from the network resource. The network resource may then receive the requested amounts of the item from those sources.

In some embodiments, based on monitoring subsystem 112 identifying that the amount of the item fails to satisfy the first threshold, sourcing subsystem 114 may identify sources based on modes of transfer between the sources and the network resource. In some embodiments, sourcing subsystem 114 may determine a mode of transfer between each source and the network resource. For example, a source may transfer items via cabling. In this example, sourcing subsystem 114 may determine the length and material of the cables. In another example, if a source requires that items be transferred across files, sourcing subsystem 114 may determine bandwidth and latency associated with the transfer path. In some embodiments, for a source that requires items to be physically transferred, sourcing subsystem 114 may determine a mode of transfer associated with the source (e.g., via foot, bike, car, etc.). In some embodiments, the threshold proximity may be determined based on the mode of transfer. For example, a source that is far from the network resource but is transferring the items via a faster connection (e.g., a 5G wireless network) may be included, while another source that is closer to the network resource but is transferring the items via a slower connection (e.g., a 2G wireless network) may be excluded. Based on the modes of transfer between the network resource and the sources, sourcing subsystem 114 may request amounts of the item to be transferred to the network resource from sources with certain modes of transfer to the network resource. The network resource may then receive the requested amounts of the item from those sources.

Based on the mode of transfer associated with each source and the distance (or route) between the source and the network resource, sourcing subsystem 114 may determine a time or an estimated time associated with each source. For example, sourcing subsystem 114 may determine that a first source is able to transfer items to the network resource within seconds while another source may require minutes or hours. In some embodiments, the threshold proximity may be determined based on the estimated time. For example, based on monitoring subsystem 112 identifying that the amount of the item fails to satisfy the first threshold, sourcing subsystem 114 may identify sources within a threshold estimated time from the network resource. For example, any sources able to arrive at a network resource within thirty minutes may be included, while sources unable to arrive at the network resource within thirty minutes may be excluded. Based on the estimated times between the network resource and the sources, sourcing subsystem 114 may request amounts of the item to be transferred to the network resource from sources within a threshold estimated time from the network resource. The network resource may then receive the requested amounts of the item from those sources.

In some embodiments, in response to monitoring subsystem 112 may identify that a current amount of the item for a network resource fails to satisfy the first threshold, sourcing subsystem 114 may identify and prioritize one or more sources from which to request amounts of the item to be transferred to the network resource. In some embodiments, sourcing subsystem 114 may assign priorities to the sources or may determine a ranking of the sources. For example, sourcing subsystem 114 may prioritize sources that are a shorter distance from the network resource, that have a shorter route to the network resource, that have the fastest mode of transfer to the network resource, or that have the shortest estimated transfer time to the network resource. In some embodiments, sourcing subsystem 114 may obtain a history associated with each source, such as a withdrawal history. Sourcing subsystem 114 may prioritize sources that have not made a withdrawal from the network resource recently (e.g., within a certain time frame). Sources that have made recent withdrawals from the network resource may be deprioritized. Sourcing subsystem 114 may additionally take into account the size of withdrawals when determining priority. In some embodiments, sourcing subsystem 114 may obtain a transfer history associated with each source. Sourcing subsystem 114 may determine the priorities of the sources based on a likelihood of each source of complete the transfer. For example, sourcing subsystem 114 may prioritize sources that have a history of successfully completing requested transfers. In some embodiments, sourcing subsystem 114 may rely on other criteria for determine priorities of the sources.

In some embodiments, the priorities or ranking may be dependent on other histories associated with the sources. For example, sourcing subsystem 114 may obtain an activity history associated with each source. The activity history may indicate typical patterns of each source. Based on the patterns, sourcing subsystem 114 may identify comfort levels, ability to travel for transfers, offline hours, or other characteristics of the sources. For example, if a source is typically active during late hours, sourcing subsystem 114 may prioritize the source for late night transfer requests. If a source is typically offline between 9 am and 12 pm, sourcing subsystem 114 may deprioritize the source for transfer requests during those hours. Sourcing subsystem 114 may rely on other histories or characteristics of the sources when determining priorities or rankings of the sources. Sourcing subsystem 114 may generate the requests for the amounts of the item based on the priorities of the sources. For example, sourcing subsystem 114 may generate or transmit requests for higher priority sources before generating or submitting requests for lower priority sources. The network resource may then receive the requested amounts of the item from the sources.

Figure 4A:
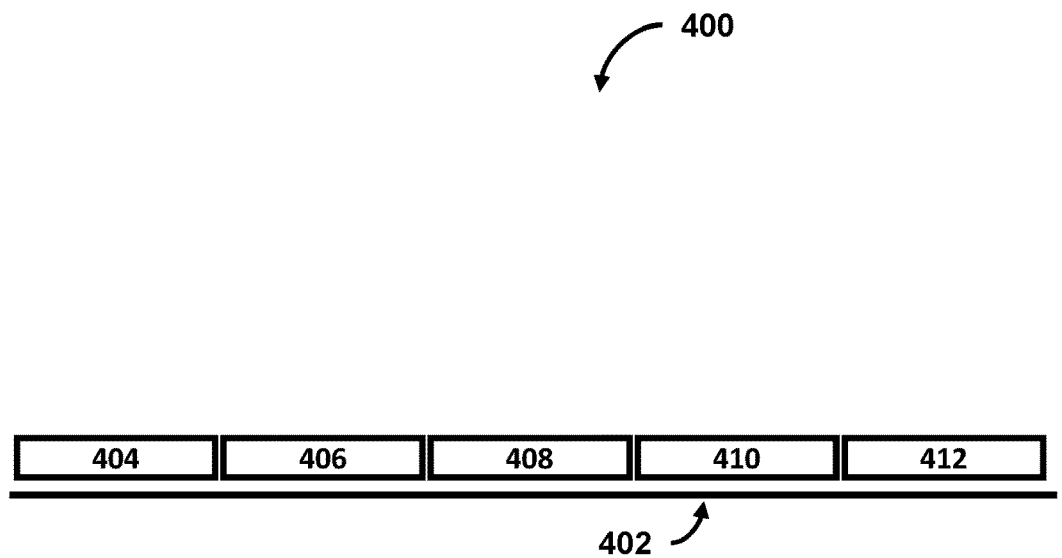
FIGS. 4A and 4B show time frames for item transfers, in accordance with one or more embodiments.

In some embodiments, once monitoring subsystem 112 has identified that the amount of the item of a network resource has failed to satisfy the first threshold, request subsystem 118 may generate requests indicating time frames related to respective transfers of amounts of the item to the network resource. For example, computer system 102 (e.g., decongestion subsystem 116) may establish time frames during which amounts of the item are to be transferred between the sources and the network resource. In some embodiments, decongestion subsystem 116 may establish time frames that do not overlap with one another in order to minimize congestion at the network resource. Congestion at the network resource may lead to slower transfers (e.g., due to limited bandwidth, increased latency, or limitations of the mode of transfer (e.g., cabling)). In some embodiments, congestion at the network resource may pose a security risk. For example, where sources are individual users, and the network resource is a physical ATM, a large number of users waiting around the ATM to deposit or withdraw cash from the ATM may increase the risk of theft or other safety concerns. FIG. 4A shows time frames 404-412 that do not overlap for item transfers, in accordance with one or more embodiments. As shown in scenario 400, time frames 404-412 are lined up along timeline 402. In some embodiments, time frames 404-412 may be back-to-back or there may be gaps between the time frames (e.g., to allow for a user or source who needs to withdraw an amount of the item from the network resource). In some embodiments, decongestion subsystem 116 may establish time frames that overlap in such a way that a limited number of sources is allowed to interact with the network resource at any particular time.

Figure 4B:
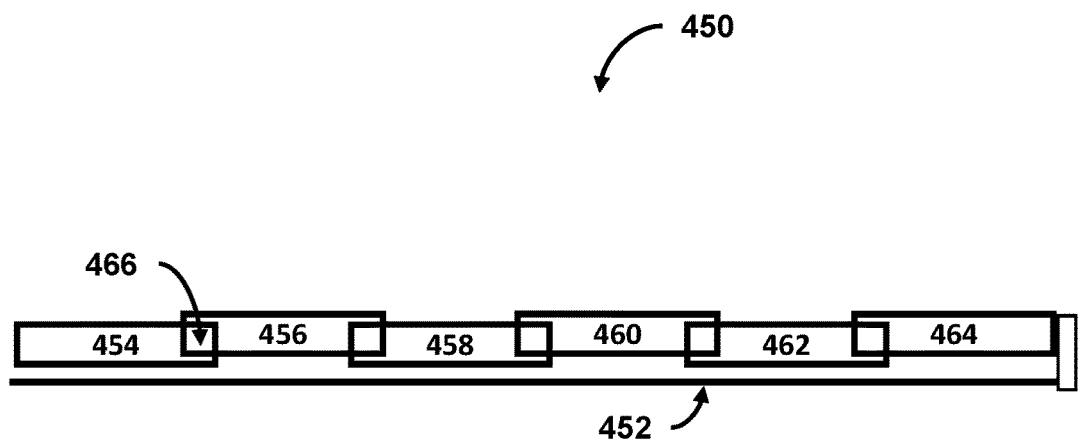

For example, FIG. 4B shows time frames 454-464 that overlap for item transfers, in accordance with one or more embodiments. As shown in scenario 450, time frames 454-464 overlap along timeline 452 such that, during certain time periods, two time frames occur simultaneously (e.g., overlap 466). In scenario 450, the time frames overlap such that two or fewer users may transfer amounts to or from the network resource at any particular time. In some embodiments, decongestion subsystem 116 may establish the time frames in any other way, such as allowing a maximum of three, four, or more time frames to overlap at various points along the timeline. In some embodiments, computer system 102 may generate requests for amounts of the item and may include the time frames in the requests, as discussed below in greater detail. The network resource may then receive the amounts of the item during the designated time frames.

In some embodiments, once monitoring subsystem 112 has identified that an amount of the item for a network resource has failed to satisfy the first threshold, computer system 102 (e.g., request subsystem 118) may generate requests for amounts of the items to be transferred between the sources and the network resource. For example, the requests may be based on the time frames established by decongestion subsystem 116. Request subsystem 118 may include, in each request, a time frame during which a source is to transfer an amount of the item to the network resource. For example, request subsystem 118 may generate a first request for a first source to transfer a first amount of the item to the network resource during a first time frame (e.g., time frame 404, as shown in FIG. 4A, or time frame 454, as shown in FIG. 4B) and a second request for a second source to transfer a second amount of the item to the network resource during a second time frame (e.g., time frame 406, as shown in FIG. 4A, or time frame 456, as shown in FIG. 4B). In some embodiments, request subsystem 118 may request that a source transfer an amount of the item during a particular time frame based on a distance, route, mode of transfer, or time that separates the source from the network resource. For example, request subsystem 118 may request that the closest source to the network resource transfer an amount of the item to the network resource during a first time frame, and so on. In some embodiments, the closest source may be determined based on the distance, route, mode of transfer, or time. Request subsystem 118 may transmit the requests including the time frames to the sources. The network resource may then receive the amounts of the item during the designated time frames.

In some embodiments, in response to monitoring subsystem 112 identifying a network resource that has an amount of the item that fails to satisfy the first threshold, request subsystem 118 may generate requests for a requested amount of the item for each source. For example, a first request for a first source may indicate that 1,000 items are requested from the first source while a second request for a second source may indicate that 200 items are requested from the second source. In some embodiments, the requested amounts of the item may be determined on an amount of the item that is needed by the network resource.

For example, the network resource may need 20,000 items in order to be completely replenished. In some embodiments, the requested amounts of the item may be based on how many sources are identified. For example, if the network resource needs 20,000 items and 20 sources are identified, request subsystem 118 may generate requests for each of the 20 sources to transfer 1,000 items to the network resource. In some embodiments, the requested amounts of the item may be based on histories associated with the sources. For example, if a particular source has a history of transferring large amounts of the item to network resources, request subsystem 118 may request a larger amount of the item from that source, as compared to other sources with histories of transferring smaller amounts or with no transfer histories at all. In this example, request subsystem 118 may request 8,000 items (e.g., of the 20,000 items needed) from a source with a history of transferring large amounts and may request smaller amounts of the item from other sources. In some embodiments, request subsystem 118 may request a maximum amount of the item that each source is able/willing to transfer to the network resource. In some embodiments, request subsystem 118 may generate and transmit the requests including the requested amounts of the item. The network resource may then receive the requested amounts of the item from the sources.

In some embodiments, in response to monitoring subsystem 112 identifying a network resource that has an amount of the item that fails to satisfy the first threshold, request subsystem 118 may request a specific item that is limited. For example, access rights to a particular software program may be limited. Therefore, request subsystem 118 may request the particular item that is needed from many sources, though few sources may possess the requested item. In some embodiments, only one item may be acquired from each source (e.g., each source may provide a single access right to a program). In this example, request subsystem 118 may request a single item from the sources. In some embodiments, request subsystem 118 may request particular items based on certain criteria. For example, request subsystem 118 may request certain transactions or certain blocks based on transactions in order to extend a blockchain). In this example, request subsystem 118 may require specific items and may only accept those specific items. In some embodiments, request subsystem 118 may accept any type of a particular item (e.g., tokens) for replenishment. In some embodiments, request subsystem 118 may request various other amounts or types of the item from the sources. Request subsystem 118 may transmit the requests to the sources, each request including the particular item or items that is requested from each source, and may receive the requested item or items from each source.

In some embodiments, in response to monitoring subsystem 112 identifying a network resource that has an amount of the item that fails to satisfy the first threshold, request subsystem 118 may generate requests that include incentive for the sources. For example, incentives may include rewards, points, payments, discounts, or other offers for transferring the item to the network resource. In some embodiments, the incentives may be personalized for each source. For example, request subsystem 118 may obtain a history associated with a source (e.g., a payment history) and may determine incentives appropriate for the source based on the history. For example, if the source is associated with high spending of a particular type, request subsystem 118 may include, in the request for the source, a discount or reward associated with the particular type of spending. In some embodiments, other types of incentives may be included in the requests. The incentives may be selected or scaled based on a priority (e.g., as described above) associated with each source. For example, for a high priority source, request subsystem 118 may generate a request that comprises high discounts or rewards. In contrast, for a low priority source, request subsystem 118 may generate a request that comprises low discounts or rewards or no incentives at all. Request subsystem 118 may transmit the requests including the incentives to the sources and may receive the amounts of the item from the sources.

In some embodiments, monitoring subsystem 112 may identify a network resource that has an amount of the item that fails to satisfy the first threshold. In response, request subsystem 118 may generate requests including incentives that are based on how urgently the network resource requires amounts of the item. For example, monitoring subsystem 112 may determine how much of the item is needed by a network resource or how quickly an amount of the item is needed by the network resource to determine how urgently the network resource requires the item. Based on the urgency, request subsystem 118 may determine or alter incentives included in the requests for the sources. For example, if a network resource urgently requires a large amount of the item, request subsystem 118 may generate requests including large incentives for the sources. In some embodiments, if a network resource does not urgently require large amounts of the item, request subsystem 118 may remove or lower the incentives for the sources. In some embodiments, request subsystem 118 may determine the incentives based on the distances between the sources and the network resource. For example, request subsystem 118 may offer higher incentives for sources that are farther from the network resource or that require more time or power to transfer the item to the network resource. Request subsystem 118 may offer lower incentives or no incentives at all for sources that are closer to the network resource or that require less time or power to transfer the item to the network resource. In some embodiments, request subsystem 118 may transmit the requests including the incentives to the sources.

In some embodiments, in response to monitoring subsystem 112 identifying a network resource that has an amount of the item that fails to satisfy the first threshold, request subsystem 118 may generate requests that include warnings or notifications. For example, a network resource may include hardware (e.g., a camera) or software (e.g., security system) for assessing the security threats to the network resource. For example, a security system may evaluate the network resource and identify any malicious software that could pose a threat to a source. In another example, a camera may capture the area surrounding the network resource and may identify any individuals lurking near the network resource. In response to any identified security concerns, request subsystem 118 may include a warning or notification of the security concern in the generated requests. In some embodiments, request subsystem 118 may cancel one or more requests in response to identifying a security concern. In some embodiments, in response to identifying a security concern, request subsystem 118 may adjust the time frames established be decongestion subsystem 116. For example, if decongestion subsystem 116 previously established overlapping time frames (e.g., as shown in FIG. 4B), request subsystem 118 may alter the time frames such that they are no longer overlapping (e.g., as shown in FIG. 4A). Request subsystem 118 may thereby adjust various aspects of the sourcing process in response to security concerns. Request subsystem 118 may transmit the requests including the warnings or notifications to the sources and may receive the amounts of the item from the sources.

In some embodiments, in response to monitoring subsystem 112 identifying a network resource that has an amount of the item that fails to satisfy the first threshold, request subsystem 118 may generate requests based on weighing various factors against safety concerns. For example, monitoring subsystem 112 may determine how much of the item is needed by a network resource or how quickly an amount of the item is needed by the network resource to determine how urgently the network resource requires the item. Sourcing subsystem 114 may weigh the urgency of the network resource against any safety concerns relating to the network resource (e.g., as discussed above). For example, in situations with low urgency and high safety concerns, request subsystem 118 may forgo transmission of requests for the item or decongestion subsystem 116 may postpone the time frames until the safety concern has expired or has been handled. In another example, in situations with high urgency and high safety concerns, decongestion subsystem 116 may adjust the time frames such that they do not overlap. In another example, in situations with high urgency and low safety concerns, decongestion subsystem 116 may adjust the time frames such that they overlap with each other or are shorter (e.g., to allow for more transmissions of the item in a shorter period of time). In some embodiments, sourcing subsystem 114 may further consider distances between the sources and network resource. For example, in the face of a safety concern, sourcing subsystem 114 may prioritize sources that are closer to the network resource in order to minimize time that the sources must spend traveling to the network resource or transferring the item to the network resource. In some embodiments, request subsystem 118 may forgo transmission of requests to any sources that are not within a small threshold proximity of the network resource while there is a safety concern. In some embodiments, request subsystem 118 may transmit the requests (or forgo transmission of certain requests) to the sources based on weighing the safety concerns against these various factors.

In some embodiments, once request subsystem 118 has generated requests for amounts of the item to be transferred from sources to the network resource, request subsystem 118 may transmit the requests to the sources. For example, request subsystem 118 may transmit a first request to a first source and a second request to a second source. In some embodiments, request subsystem 118 may include a time frame in each request based on the order in which the requests are transmitted to the sources. For example, the first request to be transmitted may include time frame 404, as shown in FIG. 4A, or time frame 454, as shown in FIG. 4B. The second request to be transmitted may include time frame 406, as shown in FIG. 4A, or time frame 456, as shown in FIG. 4B, and so on. In some embodiments, the requests may be transmitted according to the time frames selected for each source. For example, based on an estimated transmission time associated with each source (e.g., based on the distance, route, mode of transfer, etc.), request subsystem 118 may transmit each request at a time such that the item will arrive at the network resource within its associated time frame. The network resource may then receive the requested amounts of the item from the sources.

In some embodiments, in response to monitoring subsystem 112 identifying a network resource that has an amount of the item that fails to satisfy the first threshold, request subsystem 118 may generate and transmit requests to communication subsystem 126 of client devices 104a-104n. Each client device may display the request to a user of the client device (e.g., the source) via display subsystem 124. The displayed request may include an invitation to confirm or deny the request. For example, the request may include "yes" and "no" options. In some embodiments, the request may include options to adjust an amount included in the request. For example, if the request indicated that 1,000 items are being requested from the source, the request may include an option for the user to alter the amount (e.g., to a higher or lower amount) before confirming. Via user interface subsystem 122, a user of the client device may select options based on whether or not they plan to complete the request and how much of the item they are able or willing to transfer.

Communication subsystem 126 may transmit the confirmation or denial of the request to request subsystem 118. Based on the responses received from the client devices 104a-104n (e.g., the sources), request subsystem 118 may make adjustments accordingly. For example, request subsystem 118 may adjust the time frames or an order of the time frames associated with the sources that confirmed the requests. In some embodiments, request subsystem 118 may adjust incentives included in the requests. For example, request subsystem 118 may re-send a denied request and may add an incentive or include a higher incentive than was previously offered. In some embodiments, request subsystem 118 may alter a requested amount of the item from the sources that confirmed the transfer. For example, if half of the sources denied the transfer requests, request subsystem 118 may request a doubled amount of the item from each source that confirmed the transfer requests. In some embodiments, request subsystem 118 may make other adjustments based on the responses received from client devices 104a-104n. The network resource may then receive the requested amounts of the item from the sources that confirmed the transfer requests.

In some embodiments, in response to monitoring subsystem 112 identifying a network resource that has an amount of the item that fails to satisfy the first threshold, request subsystem 118 may generate requests for amounts of the item during the established time frames (e.g., as illustrated in FIGS. 4A and 4B). For example, a first source may transmit a first amount of the item to the network resource during a first time frame (e.g., time frame 404, as shown in FIG. 4A, or time frame 454, as shown in FIG. 4B). In some embodiments, as shown in FIG. 4B, if two sources transmit amounts of the item to the network resource at the same time (e.g., during overlap 466), the network resource may only accept one transfer at a time. For example, the network resource may require one of the sources to wait or may require amounts of the item from one of the sources to buffer. In some embodiments, certain network resources may accept multiple transfers at once, in which case multiple sources may be able to transfer amounts of the item simultaneously (e.g., during overlap 466). In some embodiments, a maximum number of transfers that may occur at one time or within a period of time may depend on a type of the network resource. For example, network resource may accept a certain number of transfers at one time or within a period of time based on a bandwidth associated with the network resource, limitations of the mode of transfer, a number of receptacles (e.g., cassettes) housed by the network resource, or another factor.

In some embodiments, once request subsystem 118 has transmitted a request to a source for a network resource having an amount of the item that fails to satisfy the first threshold, the source may be required to provide certain information in order to interact with the network resource.

For example, the source may be required to provide an identifier associated with the source (e.g., a name, a code, facial recognition, touch recognition, etc.). In another example, the source may be required to provide a passcode or a keyword that is included in the request or that was provided to the source in response to the source's confirmation of the transfer. In some embodiments, the source may be required to pair a client device (e.g., client device 104) with the network resource (e.g., network resource 106) in order to gain access to the network resource to begin the transfer. In some embodiments, information (e.g., a passcode or keyword) or a pairing request may be transmitted to a client device of the source once the source is within a certain radius of the network resource. For example, once the source arrives at the network resource, request subsystem 118 may provide the source with information or a pairing that is required to gain access to the network resource. In some embodiments, the source may be required to enter information into a third party application on the client device (e.g., an amount of the item to be transferred) to gain access to the network resource. In some embodiments, once the source provides the required information, the source may transfer the requested amount of the item to the network resource.

In some embodiments, monitoring subsystem 112 may request amounts of the item to be transferred from sources to a network resource having an amount of the item that fails to satisfy the first threshold. Once the requested amounts of the item have been transferred from the sources to the network resource, the network resource may add the received amounts of the item to a current amount of the item associated with the network resource. The current amount of the item may thus be replenished over time as the network resource receives the amounts of the item from the sources. While the network resource is receiving amounts of the item, the network resource may be in the second state (e.g., accepting interactions which replenish the item, as previously described). The network resource may remain in the second state until an event occurs. For example, the network resource may remain in the second state until a second threshold associated with the network resource is satisfied. In some embodiments, the network resource may remain in the second state until all requested amounts of the item are received. In some embodiments, in response to the current amount of the item of the network resource satisfying the second threshold, request subsystem 118 may cease or revoke the transmission of requests to sources.

For example, FIG. 2C represents network resource 200 with an amount 210 of the item. For example, FIG. 2C may represent network resource 200 at some time later than FIG. 2B. As discussed above, FIG. 2B represents network resource 200 having an amount of the item 208 that fails to satisfy the first threshold 202. In response, sourcing subsystem 114 may identify one or more sources and may request that the sources transfer amounts of the item to network resource 200. As shown in FIG. 2C, network resource 200 has received the requested amounts of the item and the current amount 210 of the item satisfies the second threshold 204. In some embodiments, monitoring subsystem 112 may identify the amount 210 of the item satisfying the second threshold 204 as an event. In response to the event, monitoring subsystem 112 may cause the network resource 200 to switch states. For example, the network resource 200 may be in the second state and may switch to the first state once the amount 210 satisfies the second threshold 204. In order words, once the amount 210 of the item satisfies the second threshold 204, the network resource 200 may cease accepting interactions (e.g., with user or sources s) that replenish the item. In some embodiments, once the amount 210 of the item satisfies the second threshold 204, the network resource 200 may cease requesting transfers of the item to the network resource.

In some embodiments, monitoring subsystem 112 may identify a network resource having an amount of the item that fails to satisfy a first threshold and request subsystem 118 may transmit requests to sources for amounts of the item to be transferred to the network resource during time frames. In some embodiments, one or more sources may attempt to transfer amounts of the item outside of the designated time frames. For example, a source may be assigned to a particular time frame (e.g., time frame 410, as shown in FIG. 4A) but may attempt to transfer an amount of the item during an earlier time frame (e.g., time frame 406). Request subsystem 118 may generate a notification (e.g., an error notification) and transmit the notification to the source. In some embodiments, the notification may comprise the correct time frame for the source. In another example, a source may be assigned to a particular time frame (e.g., time frame 458, as shown in FIG. 4B) but may attempt to transfer an amount of the item during a later time frame (e.g., time frame 460). Request subsystem 118 may generate a notification (e.g., an error notification) and transmit the notification to the source. In some embodiments, the notification may comprise a new time frame for the source (e.g., time frame 464). In some embodiments, the notification may comprise an indication that the request has been cancelled.

In some embodiments, once all requested amounts of the item have been received by the network resource, the network resource may return to the first state. For example, the network resource may accept interactions that withdraw the item from the network resource but may not accept interactions that replenish the item. In some embodiments, the network resource may accept interactions that withdraw amounts of the item from the network resource throughout the entire item sourcing process. In some embodiments, the network resource may accept withdrawal interactions only during gaps between the time frames or may pause withdrawal interactions altogether during the item sourcing process.

In some embodiments, each network resource may be a software program (e.g., a smart contract on a blockchain) or another network resource. Each network resource may be associated with an item that the network resource requires in order to function. For software programs, items may be transactions, rights (e.g., access rights), or other items. In one example, a smart contract on a blockchain may require transactions to be included in a block of a blockchain in order to execute the smart contract. In another example, a software program may require access rights from various sources in order to gain entry to the program. For example, the item may be distributed to various sources prior to the network resource operating (e.g., access rights to a software program) or as the network resource operates (e.g., transactions that form a blockchain). In some embodiments, the item may be generated by dispersed systems and may subsequently become associated with the network resource (e.g., transactions that are generated and subsequently added to a block of a blockchain).

In some embodiments, the distributed items may be sourced for the network resource when the network resource is unable to function or will soon be unable to perform certain operations due to a lack of the item or a limited amount of the item. For example, if monitoring subsystem 112 identifies that the network resource has an amount of the item that fails to satisfy the first threshold, request subsystem 118 may generate requests for sources to transfer amounts of the access rights, transactions, or other items to the network resource. For example, request subsystem 118 may generate requests for access rights, transactions, or other items to be digitally transferred to the network resource or transferred to the network resource via another mode of transfer. In some embodiments, the requests may comprise time frames during which the sources are to transfer amounts of the item to the network resource. Once the network resource receives the amounts of the item during the time frames, the received items may be added to the current items of the network resource. Once the current amount of the item associated with the network resource satisfies a second threshold, request subsystem 118 may cease requesting amounts of the item to be transferred to the network resource from the sources.

In some embodiments, a network resource may be a website or other online service. In this example, the amount of the item may be processing units from a cloud service, and the website or other online service may require a certain number of processing units in order to support visitors to the site or users of the online service. If the network resource expects a large influx of users or visitors, monitoring subsystem 112 may identify that the network resource currently has insufficient processing power to handle the influx of users (e.g., by scaling out). Request subsystem 118 may therefore request additional processing units from sources (e.g., servers, cloud services, etc.). In some embodiments, request subsystem 118 may request a certain number of processing units for a certain time period (e.g., the time period during which the network resource is expected to experience the influx of users). However, if every source were to provide the requested processing units simultaneously, the network resource may receive an excess of processing units for a period time, leading to unforeseen costs and wasted resources. The wasted processing units would be unavailable to other network resources during this time period, which could cause a shortage across the system. To combat this issue, decongestion subsystem 116 may assign time frames during which each source is to provide the processing units to the network resource. In some embodiments, decongestion subsystem 116 may determine the time frames for each source based on a distance or route between the source and the network resource, a mode of transfer between the source and the network resource, an estimated time of travel between the source and the network resource, or some other factor. The time frames may overlap to some extent in order to provide the network resource with seamless coverage without wasting processing units. Request subsystem 118 may generate requests for the sources to transfer the processing units to the network resource, and the requests may include the time frames for each source. The network resource may receive the processing units during the time frames and may cease requesting the processing units once the network resource has a sufficient amount of processing power.

In some embodiments, each network resource may be a physical resource (e.g., an automated teller machine (ATM) or another physical network resource). For ATMs, the items may be currencies (e.g., tokens or bills) or other items, and the ATM may require a certain amount of currency in the machine in order to dispense money to users. In some embodiments, monitoring subsystem 112 may determine that the amount of currency associated with the ATM fails to satisfy a first threshold associated with the ATM. For example, a failure to satisfy the first threshold may comprise falling below the first threshold (e.g., not enough of the item). In some embodiments, monitoring subsystem 112 may predict that the amount of the item will fail to satisfy the first threshold at some time in the future. For example, monitoring subsystem 112 may identify a trend (e.g., a downward trend) in the current amount of the item of the network resource and may predict, based on the trend, that the amount of the item will fail to satisfy the first threshold in the future. In some embodiments, in response to monitoring subsystem 112 determining that the amount of the item of the network resource fails or will fail to satisfy the first threshold, request subsystem 118 may generate requests for sources to transfer currency to the ATM. In some embodiments, the sources may be customers of an organization (e.g., a bank) associated with the ATM. In some embodiments, the requests may include time frames (e.g., generated by decongestion subsystem 116) during which each source is to transfer the currency to the ATM. In some embodiments, decongestion subsystem 116 may determine the time frames for each source based on a distance or route between the source and the network resource, a mode of transfer between the source and the network resource, an estimated time of travel between the source and the network resource, or some other factor. Request subsystem 118 may transmit the requests to the sources, the requests including the time frames for the sources. The sources may confirm requests to transfer currency to the ATM (e.g., deposit currency) in response to receiving the requests. In order to transfer the requested currency to the ATM, the sources may deliver the currency to the location of the ATM and deposit the currency in the ATM during the assigned time frame. Once the currency level of the ATM satisfies a second threshold associated with the ATM, request subsystem 118 may cease requesting that sources transfer currency to the ATM.

In some embodiments, monitoring subsystem 112 may determine that the amount of currency associated with the ATM fails to satisfy a first threshold associated with the ATM. For example, a failure to satisfy the first threshold may comprise exceeding the first threshold (e.g., too much of the item). In some embodiments, monitoring subsystem 112 may predict that the amount of the item will fail to satisfy the first threshold at some time in the future. For example, monitoring subsystem 112 may identify a trend (e.g., an upward trend) in the current amount of the item of the network resource and may predict, based on the trend, that the amount of the item will fail to satisfy the first threshold in the future. In some embodiments, in response to monitoring subsystem 112 determining that the amount of the item of the network resource fails or will fail to satisfy the first threshold, request subsystem 118 may generate requests for the sources to remove currency from the ATM. As described above, the sources may be customers of an organization (e.g., a bank) associated with the ATM. In some embodiments, the requests may include time frames (e.g., generated by decongestion subsystem 116) during which the ATM is to transfer the currency to the sources. In some embodiments, decongestion subsystem 116 may determine the time frames for the transfer to each source based on a distance or route between the source and the network resource, a mode of transfer between the source and the network resource, an estimated time of travel between the source and the network resource, or some other factor. Request subsystem 118 may transmit the requests to the sources, the requests including the time frames for receiving the currency from the ATM. The sources may confirm requests to receive (e.g., withdraw) currency from the ATM in response to receiving the requests. In order to withdraw the requested currency from the ATM, the sources may travel to the location of the ATM and withdraw the currency from the ATM during the assigned time frame. Once the currency level of the ATM satisfies a second threshold associated with the ATM, request subsystem 118 may cease requesting that sources withdraw currency from the ATM.

In some embodiments, other methods of minimizing congestion at network resources during item sourcing may be used. For example, the item may be sourced during times of the day or days of the week that are less busy (e.g., during which the network resource is less frequently used). In some embodiments, a network resource may be replenished in stages. For example, the network resource may periodically accept sourced items for a short period of time. The network resource may repeat this process until the network resource reaches an item capacity or until a second threshold is satisfied. In some embodiments, decongestion subsystem 116 may determine alternative methods for minimizing congestion at network resources during item sourcing.

Figure 5:
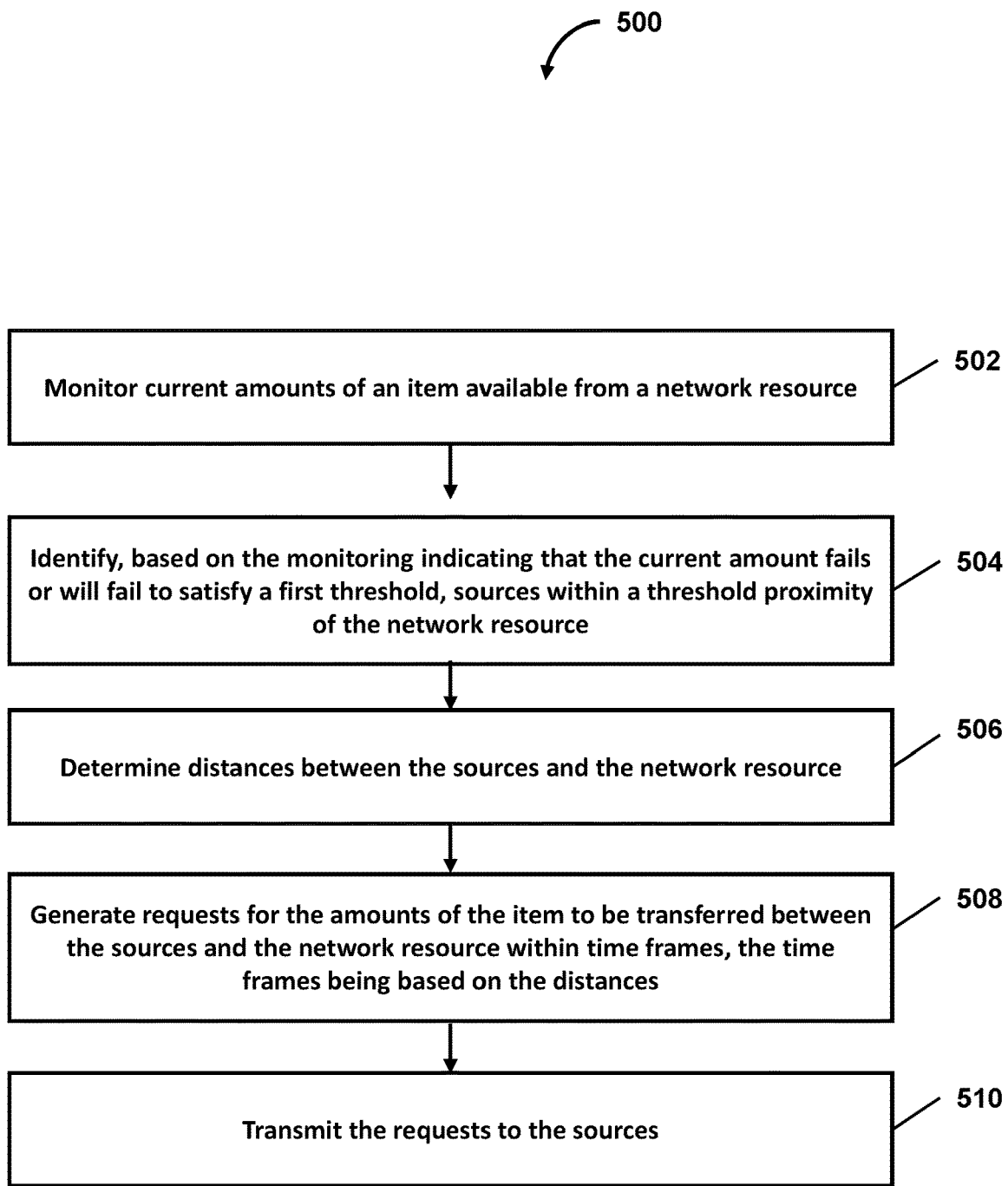
FIG. 5 shows a flowchart of a method of facilitating reduction of network resource congestion, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart 500 of a method of facilitating reduction of network resource congestion, in accordance with one or more embodiments. In an operation 502, a current amount of an item available from a network resource may be monitored. Operation 502 may be performed by a subsystem that is the same as or similar to monitoring subsystem 112, in accordance with one or more embodiments. In an operation 504, based on the monitoring indicating that the current amount fails or will fail to satisfy a first threshold, one or more sources within a threshold proximity of the network resource may be identified. For example, the monitoring may indicate that the current amount fails to satisfy the first threshold due to the current amount falling below the first threshold (i.e., not enough of the item). In another example, the monitoring may indicate that the current amount fails to satisfy the first threshold due to the current amount exceeding the first threshold (i.e., too much of the item). In some embodiments, the monitoring may lead to a prediction. For example, the monitoring may indicate a trend in the current amount of the item. The monitoring may therefore indicate that the current amount will fail to satisfy the first threshold at some point in the future, for example, by exceeding the first threshold in the future or by falling below the first threshold in the future. For example, the sources may transfer amounts of the item to the network resource or the network resource may transfer amounts of the item to the sources. Operation 504 may be performed by a subsystem that is the same as or similar to sourcing subsystem 114, in accordance with one or more embodiments.

In an operation 506, distances between the sources and the network resource may be determined. For example, of the sources within the threshold proximity of the network resource, distances may be determined. In some embodiments, lengths of routes between the sources and the network resource may be determined. In some embodiments, modes of transfer between the sources and the network resource may be determined. In some embodiments, estimated times of transfer between the sources and the network resource may be determined. In some embodiments, additional factors may be determined. For example, safety concerns may be identified. In this example, any source for which a distance between the source and the network resource exceeds a small threshold proximity (e.g., where the small threshold proximity is determined based on the safety concern) may be disqualified, de-prioritized, or delayed. In another example, priorities of the sources may be determined and incentives may be determined for the sources based on the priorities. In another example, an urgency of the network resource's need for the item may be determined and the incentives may be determined for the sources based on the urgency. In another example, the incentives may be determined for the sources based on the distances between the sources and the network resource. Operation 506 may be performed by a subsystem that is the same as or similar to sourcing subsystem 114, in accordance with one or more embodiments.

In an operation 508, one or more requests for the amounts of the item to be transferred between the sources and the network resource may be generated. For example, if the current amount of the item fails to satisfy the threshold due to exceeding the threshold, the requests for the amounts of the item to be transferred may comprise requests for the sources to receive amounts of the item from the network resource. In another example, if the current amount of the item fails to satisfy the threshold due to falling below the threshold, the requests for the amounts of the item to be transferred may comprise requests for the sources to transfer amounts of the item to the network resource. For example, the requests may include time frames within which the amounts of the item are to be transferred between the sources and the network resource. In some embodiments, the time frames may be based on the respective distances, routes, modes of transfer, or times of transfer between the sources and the network resource. In some embodiments, the time frames may not overlap with one another in order to minimize congestion at the network resource. In some embodiments, the time frames may overlap in such a way that limits the number of sources that may transfer amounts of the item to the network resource at any particular time or to limit the number of sources which may receive amounts of the item at any particular time. In some embodiments, the time frames may be determined based on safety concerns in the vicinity of the network resource. In some embodiments, the time frames may be determined based on an urgency of the network resource's need for amounts of the item. In some embodiments, the requests may include incentives for some or all sources (e.g., based on distance, urgency, priority, or other factors). Operation 508 may be performed by a subsystem that is the same as or similar to decongestion subsystem 116 or request subsystem 118, in accordance with one or more embodiments.

In an operation 510, the requests may be transmitted to the sources. For example, the requests may be transmitted to client devices 104a-104n. In some embodiments, the requests may include requested amounts of the item from the sources. In some embodiments, the requests may include requested amounts of the item to be transferred from the network resource to each source. Operation 510 may be performed by a subsystem that is the same as or similar to request subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 130 or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 120-126, and/or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and subsystems 120-126 described herein is for illustrative purposes, and is not intended to be limiting, as any of subsystems 112-118 or subsystems 120-126 may provide more or less functionality than is described. For example, one or more of subsystems 112-118 or subsystems 120-126 may be eliminated, and some or all of its functionality may be provided by other ones of subsystems 112-118 or subsystems 120-126. As another example, additional subsystems may be programmed to perform some or all of the functionality attributed herein to one of subsystems 112-118 or subsystems 120-126.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: monitoring current amounts of an item available from network resources; identifying, based on the monitoring, a network resource; identifying one or more sources within a threshold proximity of the network resource; determining distances between the one or more sources and the network resource; generating one or more requests for the amounts of the item to be transferred between the one or more sources and the network resource within time frames, the time frames being based on the distances; and transmitting the one or more requests.
2. The method of embodiment 1, wherein the network resource is identified based on determination that a current amount of the item available from the network resource fails to satisfy a first threshold.
3. The method of embodiment 1, wherein the network resource is identified based on a prediction that a current amount of the item available from the network resource will fail to satisfy a first threshold at a future time.
4. The method of any of the preceding embodiments, wherein the current amount of the item available from the network resource failing to satisfy the first threshold comprises the current amount of the item being less than the first threshold.
5. The method of embodiment 4, wherein the one or more requests comprise one or more requests for the amounts of the item to be transferred from the one or more sources to the network resource.
6. The method of any of the preceding embodiments, wherein the current amount of the item available from the network resource failing to satisfy the first threshold comprises the current amount of the item being greater than the first threshold.

7. The method of embodiment 6, wherein the one or more requests comprise one or more requests for the amounts of the item to be transferred from the network resource to the one or more sources.
8. The method of any of the preceding embodiments, wherein the one or more requests are transmitted to the one or more sources.
9. The method of any of the preceding embodiments, wherein the one or more requests comprise a request for an amount of the item to be transferred from a source of the one or more sources to the network resource within a time frame, further comprising: ceasing or revoking the transmission of the request based on the monitoring indicating that the current amount of the item satisfies a second threshold of the network resource subsequent to the amounts of the item being received at the network resource from other sources of the one or more sources.
10. The method of embodiment 9, further comprising: obtaining utilization information related to the item and the network resource; and setting the first threshold based on the utilization information.
11. The method of embodiment 9, further comprising: obtaining capacity information related to the item and the network resource; and setting the second threshold based on the capacity information.
12. The method of any of the preceding embodiments, further comprising: assigning priorities to the one or more sources based on the distances; and determining a transmission order for transmission of the one or more requests for the amounts of the item based on the priorities of the one or more sources, wherein transmitting the one or more requests comprises transmitting the one or more requests based on the transmission order.
13. The method of any of the preceding embodiments, further comprising: assigning priorities to the one or more sources based on histories associated with the one or more sources; and determining a transmission order for transmission of the one or more requests for the amounts of the item based on the priorities of the one or more sources, wherein transmitting the one or more requests comprises transmitting the one or more requests based on the transmission order.
14. The method of any of the preceding embodiments, wherein the one or more requests are transmitted at one or more times based on the distances and the time frames.
15. The method of any the preceding embodiments, wherein the one or more requests comprise a request for an amount of the item to be transferred from a source of the one or more sources to the network resource within a time frame, further comprising: in response to the source transferring the amount of the item at a time outside of the time frame, generating a notification comprising the time frame; and transmitting the notification to the source.
16. A tangible, non-transitory, machine-readable medium storing instructions that, when executed by a data processing apparatus, causes the data processing apparatus to perform operations comprising those of any of the preceding embodiments.
17. A system comprising: one or more processors; and memory storing instructions that, when executed by the processors, cause the processors to effectuate operations comprising those of any of the preceding embodiments.

What is claimed is:
1. A system for reducing network resource congestion from distributed sourced items, the system comprising: a computer system that comprises one or more processors programmed with computer program instructions that, when executed, cause the computer system to perform operations comprising:
monitoring a current amount of an item available from a network resource, the network resource being part of a plurality of network resources on a network;
identifying, based on the monitoring indicating that the current amount fails to satisfy a first threshold, a plurality of sources within a threshold proximity of the network resource from which amounts of the item are transferred to the network resource, the plurality of sources comprising first and second sources;
determining distances between the network resource and the plurality of sources, respectively;
establishing, based on the distances, time frames during which the amounts of the item are to be transferred from the plurality of sources to the network resource such that none of the time frames overlaps with one another to minimize congestion at the network resource;
generating a plurality of requests based on the time frames, the plurality of requests comprising (i) a first request for a first source to transfer a first amount of the item to the network resource during a first time frame of the time frames and (ii) a second request for a second source to transfer a second amount of the item to the network resource during a second time frame of the time frames;
transmitting the first request to the first source and the second request to the second source;
initiating transmission of a third request for a third source to transfer a third amount of the item to the network resource; and
ceasing or revoking the transmission of the third request based on the monitoring indicating that the current amount of the item satisfies a second threshold subsequent to the first and second amounts of the item being received at the network resource from the first and second sources.
2. The system of claim 1, the operations further comprising:
transmitting a fourth request for a fourth source to transfer a fourth amount of the item to the network resource during a third time frame of the time frames;
in response to the fourth amount of the item being received at the network resource from the fourth source of the plurality of sources at a time outside of the third time frame, generating an error notification comprising the third time frame; and
transmitting the error notification to the fourth source.
3. The system of claim 1, the operations further comprising:
assigning priorities to the plurality of sources based on the distances or histories associated with the plurality of sources; and
determining a transmission order for transmission of the plurality of requests for the amounts of the item based on the priorities of the plurality of sources,
wherein transmitting the first and second requests comprises transmitting the first request to the first source prior to transmitting the second request to the second source based on the transmission order.
4. The system of claim 1, the operations further comprising:

obtaining capacity information related to the item and the network resource; and setting the second threshold based on the capacity information.

5. The system of claim 1, the operations further comprising:

obtaining utilization information related to the item and the network resource; and setting the first threshold based on the utilization information.

6. The system of claim 1, wherein the plurality of requests are transmitted at a plurality of times based on the distances and the time frames.

7. A method being implemented by one or more processors executing computer program instructions that, when executed by the one or more processors, perform the method, the method comprising:

monitoring a current amount of an item available from a network resource, the network resource being part of a plurality of network resources on a network;

identifying, based on the monitoring indicating that the current amount fails to satisfy a first threshold, a plurality of sources within a threshold proximity of the network resource from which amounts of the item are transferred to the network resource, the plurality of sources comprising first and second sources;

determining distances between the network resource and the plurality of sources, respectively;

establishing, based on the distances, time frames during which the amounts of the item are to be transferred from the plurality of sources to the network resource such that none of the time frames overlaps with one another;

generating a plurality of requests based on the time frames, the plurality of requests comprising (i) a first request for a first source to transfer a first amount of the item to the network resource during a first time frame of the time frames and (ii) a second request for a second source to transfer a second amount of the item to the network resource during a second time frame of the time frames;

transmitting the first request to the first source and the second request to the second source;

initiating transmission of a third request for a third source to transfer a third amount of the item to the network resource; and ceasing or revoking the transmission of the third request based on the monitoring indicating that the current amount of the item satisfies a second threshold subsequent to the first and second amounts of the item being received at the network resource from the first and second sources.

8. The method of claim 7, further comprising:

transmitting a fourth request for a fourth source to transfer a fourth amount of the item to the network resource during a third time frame of the time frames;

in response to the fourth amount of the item being received at the network resource from the fourth source of the plurality of sources at a time outside of the third time frame, generating an error notification comprising the third time frame; and transmitting the error notification to the fourth source.

9. The method of claim 7, further comprising:

obtaining capacity information related to the item and the network resource; and setting the second threshold based on the capacity information.

10. The method of claim 7, further comprising:

obtaining utilization information related to the item and the network resource; and setting the first threshold based on the utilization information.

11. The method of claim 7, further comprising:

assigning priorities to the plurality of sources based on the distances; and determining a transmission order for transmission of the plurality of requests for the amounts of the item based on the priorities of the plurality of sources, wherein transmitting the plurality of requests comprises transmitting the plurality of requests based on the transmission order.

12. The method of claim 7, further comprising:

assigning priorities to the plurality of sources based on histories associated with the plurality of sources; and determining a transmission order for transmission of the plurality of requests for the amounts of the item based on the priorities of the plurality of sources, wherein transmitting the plurality of requests comprises transmitting the plurality of requests based on the transmission order.

13. The method of claim 7, wherein the plurality of requests is transmitted at a plurality of times based on the distances and the time frames.

14. One or more non-transitory, computer-readable media having instructions that, when executed by one or more processors, cause operations comprising:

monitoring a current amount of an item available from a network resource, the network resource being part of a plurality of network resources on a network;

identifying, based on the monitoring indicating that the current amount fails to satisfy a first threshold, a plurality of sources within a threshold proximity of the network resource from which amounts of the item are transferred to the network resource, the plurality of sources comprising first and second sources;

determining distances between the network resource and the plurality of sources, respectively;

establishing, based on the distances, time frames during which the amounts of the item are to be transferred from the plurality of sources to the network resource such that none of the time frames overlaps with one another;

generating a plurality of requests based on the time frames, the plurality of requests comprising (i) a first request for a first source to transfer a first amount of the item to the network resource during a first time frame of the time frames and (ii) a second request for a second source to transfer a second amount of the item to the network resource during a second time frame of the time frames;

transmitting the first request to the first source and the second request to the second source;

transmitting a third request for a third source to transfer a third amount of the item to the network resource during a third time frame of the time frames;

in response to the third amount of the item being received at the network resource from the third source of the plurality of sources at a time outside of the third time frame, generating an error notification comprising the third time frame; and transmitting the error notification to the third source.

15. The one or more non-transitory, computer-readable media of claim 14, the operations further comprising:

initiating transmission of a fourth request for a fourth source to transfer a fourth amount of the item to the network resource; and ceasing or revoking the transmission of the fourth request based on the monitoring indicating that the current amount of the item satisfies a second threshold subsequent to the first and second amounts of the item being received at the network resource from the first and second sources.

16. The one or more non-transitory, computer-readable media of claim 15, the operations further comprising:

obtaining capacity information related to the item and the network resource; and setting the second threshold based on the capacity information.

17. The one or more non-transitory, computer-readable media of claim 14, the operations further comprising:

obtaining utilization information related to the item and the network resource; and setting the first threshold based on the utilization information.

18. The one or more non-transitory, computer-readable media of claim 14, the operations further comprising:

assigning priorities to the plurality of sources based on the distances; and determining a transmission order for transmission of the plurality of requests for the amounts of the item based on the priorities of the plurality of sources, wherein transmitting the plurality of requests comprises transmitting the plurality of requests based on the transmission order.

19. The one or more non-transitory, computer-readable media of claim 14, the operations further comprising:

assigning priorities to the plurality of sources based on histories associated with the plurality of sources; and determining a transmission order for transmission of the plurality of requests for the amounts of the item based on the priorities of the plurality of sources, wherein transmitting the plurality of requests comprises transmitting the plurality of requests based on the transmission order.

20. The one or more non-transitory, computer-readable media of claim 14, wherein the plurality of requests is transmitted at a plurality of times based on the distances and the time frames.

* * * * *